United States Patent
Kwak et al.

(10) Patent No.: US 8,953,573 B2
(45) Date of Patent: Feb. 10, 2015

(54) METHOD AND APPARATUS FOR DETERMINING AND MANAGING CONGESTION IN A WIRELESS COMMUNICATIONS SYSTEM

(75) Inventors: Joseph A. Kwak, Hawkesbury (CA); Marian Rudolf, Montreal (CA); Teresa Joanne Hunkeler, Montreal (CA); Shamim Akbar Rahman, Cote St. Luc (CA); Angelo A. Cuffaro, Laval (CA); Christopher R. Cave, Montreal (CA); Vincent Roy, Longueuil (CA); Athmane Touag, Chomedey (CA); Frank LaSita, Setauket, NY (US); Ahmed Ali, Nepean (CA); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/212,632

(22) Filed: Aug. 18, 2011

(65) Prior Publication Data
US 2011/0305139 A1 Dec. 15, 2011

Related U.S. Application Data

(63) Continuation of application No. 10/939,785, filed on Sep. 13, 2004, now Pat. No. 8,005,055, which is a continuation-in-part of application No. 10/897,771, filed on Jul. 23, 2004, now abandoned.

(60) Provisional application No. 60/489,385, filed on Jul. 23, 2003, provisional application No. 60/552,537, filed on Mar. 12, 2004.

(51) Int. Cl.
*H04W 4/00* (2009.01)
*H04W 48/18* (2009.01)
(Continued)

(52) U.S. Cl.
CPC .............. *H04W 48/18* (2013.01); *H04W 28/14* (2013.01); *H04W 28/08* (2013.01); *H04W 48/08* (2013.01); *H04W 48/12* (2013.01); *H04W 48/20* (2013.01); *H04W 72/00* (2013.01); *H04W 74/08* (2013.01)

USPC ................ 370/338; 370/395.21; 370/395.43; 455/452.1; 455/452.2

(58) Field of Classification Search
USPC ............... 370/338, 395.21, 395.43; 709/225; 455/452.1, 452.2, 453, 414.3
See application file for complete search history.

(56) References Cited

U.S. PATENT DOCUMENTS

| 5,856,971 A | 1/1999 | Gitlin et al. |
| 5,859,838 A | 1/1999 | Soliman |

(Continued)

FOREIGN PATENT DOCUMENTS

| EP | 1 156 623 | 11/2001 |
| EP | 1 515 487 | 3/2005 |

(Continued)

OTHER PUBLICATIONS

"Draft Recommended Practice for Multi-Vendor Access Point Interoperability via an Inter-Access Point Protocol Across Distrubution Systems Supporting IEEE 802.11 Operation." IEEE Std. 802.11f/D3.1, Apr. 2002.

(Continued)

*Primary Examiner* — Marcos Torres
(74) *Attorney, Agent, or Firm* — Volpe and Koenig, P.C.

(57) ABSTRACT

A method and apparatus may be used for network management via MAC measurements. The measurements may include WTRU uplink traffic loading measurement, and an AP service loading measurement. The measurements may be applicable to at least to layers 1 and 2 as applied to, for example, 802.11k in the context of OFDM and CDMA 2000 systems, but may be applicable to other scenarios as well. A method for determining and transmitting congestion information may be provided for a Wireless Local Area Network (WLAN) system. The method and apparatus may be used for managing congestion when congestion is detected. The method and apparatus may be used in wireless systems that use a Carrier Sense Multiple Access/Collision Avoidance (CSMA/CA) mechanism. The methods may be implemented in wireless transmit/receive units (WTRU)s and access points (AP)s of various forms.

27 Claims, 7 Drawing Sheets

(51) Int. Cl.
*H04W 28/14* (2009.01)
*H04W 28/08* (2009.01)
*H04W 48/08* (2009.01)
*H04W 48/12* (2009.01)
*H04W 48/20* (2009.01)
*H04W 72/00* (2009.01)
*H04W 74/08* (2009.01)

(56) References Cited

U.S. PATENT DOCUMENTS

| | | |
|---|---|---|
| 6,016,311 A | 1/2000 | Gilbert et al. |
| 6,233,222 B1 | 5/2001 | Wallentin |
| 6,611,522 B1 | 8/2003 | Zheng et al. |
| 6,621,792 B1 | 9/2003 | Petty |
| 6,801,777 B2 | 10/2004 | Rusch |
| 6,804,222 B1 | 10/2004 | Lin et al. |
| 6,816,732 B1 | 11/2004 | Farley et al. |
| 6,850,981 B1 | 2/2005 | Ho et al. |
| 6,862,270 B1 | 3/2005 | Ho |
| 6,925,302 B2 | 8/2005 | Kojima et al. |
| 6,944,129 B1 | 9/2005 | Duncan |
| 6,950,397 B1 | 9/2005 | Ho et al. |
| 6,970,422 B1 | 11/2005 | Ho et al. |
| 6,985,465 B2 | 1/2006 | Cervello et al. |
| 6,985,740 B2 | 1/2006 | Shyy et al. |
| 6,996,651 B2 | 2/2006 | Garinger et al. |
| 6,999,442 B1 | 2/2006 | Ho et al. |
| 7,020,438 B2 | 3/2006 | Sinivaara et al. |
| 7,031,287 B1 | 4/2006 | Ho et al. |
| 7,039,032 B1 | 5/2006 | Ho et al. |
| 7,120,092 B2 | 10/2006 | del Prado Pavon et al. |
| 7,245,592 B2 | 7/2007 | Soomro et al. |
| 7,366,103 B2 * | 4/2008 | Engwer et al. ............... 370/252 |
| 2001/0005177 A1 | 6/2001 | Norimatsu |
| 2001/0006552 A1 | 7/2001 | Salokannel |
| 2001/0037395 A1 | 11/2001 | Sabat et al. |
| 2002/0067696 A1 | 6/2002 | Ho |
| 2002/0085719 A1 | 7/2002 | Crosbie |
| 2002/0110105 A1* | 8/2002 | Awater et al. ............... 370/338 |
| 2002/0141376 A1 | 10/2002 | Kandala |
| 2002/0172186 A1 | 11/2002 | Larsson |
| 2002/0188723 A1 | 12/2002 | Choi et al. |
| 2003/0007467 A1 | 1/2003 | Sawada et al. |
| 2003/0013477 A1 | 1/2003 | McAlinden |
| 2003/0035399 A1 | 2/2003 | Ishibashi et al. |
| 2003/0081547 A1 | 5/2003 | Ho et al. |
| 2003/0091066 A1 | 5/2003 | Choi et al. |
| 2003/0093526 A1 | 5/2003 | Nandagopalan et al. |
| 2003/0137993 A1 | 7/2003 | Odman |
| 2003/0163579 A1 | 8/2003 | Knauerhase et al. |
| 2003/0176200 A1 | 9/2003 | Harrison |
| 2003/0214905 A1 | 11/2003 | Solomon et al. |
| 2003/0214928 A1 | 11/2003 | Chuah |
| 2003/0214974 A1 | 11/2003 | Beverly et al. |
| 2004/0008690 A1 | 1/2004 | Kandala |
| 2004/0039817 A1 | 2/2004 | Lee et al. |
| 2004/0042435 A1 | 3/2004 | Soomro et al. |
| 2004/0047351 A1 | 3/2004 | Del Prado Pavon et al. |
| 2004/0053606 A1 | 3/2004 | Artamo et al. |
| 2004/0053624 A1 | 3/2004 | Frank et al. |
| 2004/0057398 A1 | 3/2004 | Black |
| 2004/0077349 A1 | 4/2004 | Barak et al. |
| 2004/0078598 A1 | 4/2004 | Barber et al. |
| 2004/0085959 A1 | 5/2004 | Ohkawa |
| 2004/0090943 A1 | 5/2004 | da Costa et al. |
| 2004/0095942 A1 | 5/2004 | Lung |
| 2004/0103278 A1 | 5/2004 | Abhishek et al. |
| 2004/0105416 A1 | 6/2004 | Rue |
| 2004/0114535 A1 | 6/2004 | Hoffmann et al. |
| 2004/0122954 A1 | 6/2004 | Shaheen |
| 2004/0125779 A1 | 7/2004 | Kelton et al. |
| 2004/0141522 A1 | 7/2004 | Texerman et al. |
| 2004/0166835 A1* | 8/2004 | Johansson et al. ......... 455/414.1 |
| 2004/0202141 A1 | 10/2004 | Sinivaara et al. |
| 2004/0235478 A1 | 11/2004 | Lindquist et al. |
| 2004/0248587 A1 | 12/2004 | Niemenmaa |
| 2004/0252696 A1 | 12/2004 | Kakishima et al. |
| 2005/0009565 A1 | 1/2005 | Kwak |
| 2005/0025181 A1 | 2/2005 | Nazari |
| 2005/0117602 A1 | 6/2005 | Carrigan et al. |
| 2005/0128977 A1 | 6/2005 | Kwak et al. |
| 2005/0174973 A1 | 8/2005 | Kandala et al. |
| 2006/0014492 A1 | 1/2006 | Del Prado Pavon et al. |
| 2006/0184698 A1 | 8/2006 | Conley et al. |
| 2006/0194586 A1 | 8/2006 | Tran |
| 2006/0227706 A1* | 10/2006 | Burst, Jr. ............... 370/229 |
| 2006/0268703 A1 | 11/2006 | Hautala |
| 2007/0019665 A1 | 1/2007 | Benveniste |
| 2007/0054632 A1 | 3/2007 | Lu et al. |

FOREIGN PATENT DOCUMENTS

| | | |
|---|---|---|
| JP | 11275655 A2 | 10/1999 |
| JP | 2003-324449 | 11/2003 |
| WO | 2004/028175 | 4/2004 |
| WO | 2006/005224 | 1/2006 |

OTHER PUBLICATIONS

"Draft Supplement to Standard for Information Technology—Telecommunications and Information Exchange Between Systems—LAN/MAN Specific Requirements—Part 11: Wireless Medium Access Control (MAC) and physical layer (PHY) specifications: Spectrum and Transmit Power Management extensions in the 5GHz band in Europe." P802.11h/D3.11, May 2003.

"Draft Supplement to Standard for Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)." IEEE Std 802.11e/D4.4, Jun. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.1, Mar. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.15, Jun. 2004.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.9, Nov. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.10, Nov. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.4, Jul. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.3, Jul. 2003.

"Draft Supplemental to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.2, May 2003.

Bilstad et al. "IEEE P802.11 Wireless LANs—Roaming Improvements." Mar. 13, 2003. IEEE 802.11-02/196r2.

(56) References Cited

OTHER PUBLICATIONS

Bilstad, Mark. "IEEE P802.11 Wireless LANs—Roaming Improvements." Mar. 13, 2003. IEEE 802.11-02/678r.
Black et al. "A Framework for Radio Resource Measurement (RRM)." Jan. 14th, 2003. doc.: IEEE 802.11-03/080r0.
Black et al. "A Framework for RRM." Jan. 2003. doc.: IEEE 802.11-03/080r0A.
Black et al. "Proposals for STA Statistics Gathering, Distribution of RRM Information & Measurement Thresholds." May 12, 2003. doc.: IEEE 802.11-03/338r0.
Kandala, Srinivas. "IEEE P802.11 Wireless LANs—Minutes of Tge ad hoc teleconferences." Jun. 4, 2003. IEEE 802.11-03/276r9.
Ni et al. "A Survey of QoS Enhancements for IEEE 802.11 Wireless LAN." Journal of Wireless Communications and Mobile Computing, vol. 4, Issue 5, Aug. 5, 2004; pp. 547-566.
Paine, Richard H. "IEEE 802.11. Radio Resource Measurement Requirements and Issues." Oct. 19, 2002.
Paine, Richard H. "IEEE P802.11 Wireless LANs. Radio Resource Measurement Issues." Jan. 2003. doc.: IEEE 802.11-03/134r0.
Paine, Richard. "Draft Outline for the Radio Resource Measurement Requirements and Issues Document." Aug. 27, 2002. IEEE 802.11-02/508r4.
Paine, Richard. Radio Resource Measurement—801.11k DFW Mar. 10, 2003—802.11 WG Plenary. Mar. 2003. IEEE 802.11-03/189r0.
Paine, Richard. "Radio Resource Measurement Tutorial." Nov. 2002. doc.: IEEE 802.11-02/651r0.
Shankaranarayanan et al. Equivalent Circuit Rate: A User-based Performance Metric for Shared Packet Access Networks. Jul. 16, 2003. IEEE C802.20-03/64.
Song et al., "Enhancement of IEEE 802.11 Distributed Coordination Function with Exponential Increase Exponential Decrease Backoff Algorithm," The 57th IEEE Semiannual Vehicular Technology Conference, vol. 4, pp. 2775-2778 (Apr. 22-25, 2003).
"Information technology—Telecommunications and information exchange between systems—Local and metropolitan area networks—Specific requirements—Part 11: Wireless LAN Medium Access Control (MAC) and Physical Layer (PHY) Specifications." ANSI/IEEE Std 802.11, 1999 Edition (R2003).
Chen et al., "Supporting Real-Time Traffic with QoS in IEEE 802.11e Based Home Networks," First IEEE Consumer Communications and Networking Conference, pp. 205-209 (Jan. 8, 2004).
Annese et al., "Providing Delay Guarantees in IEEE 802.21e Networks," Proceedings of the 2004 IEEE Vehicular Technology Conference, vol. 4, pp. 2234-2238 (May 2004).

\* cited by examiner

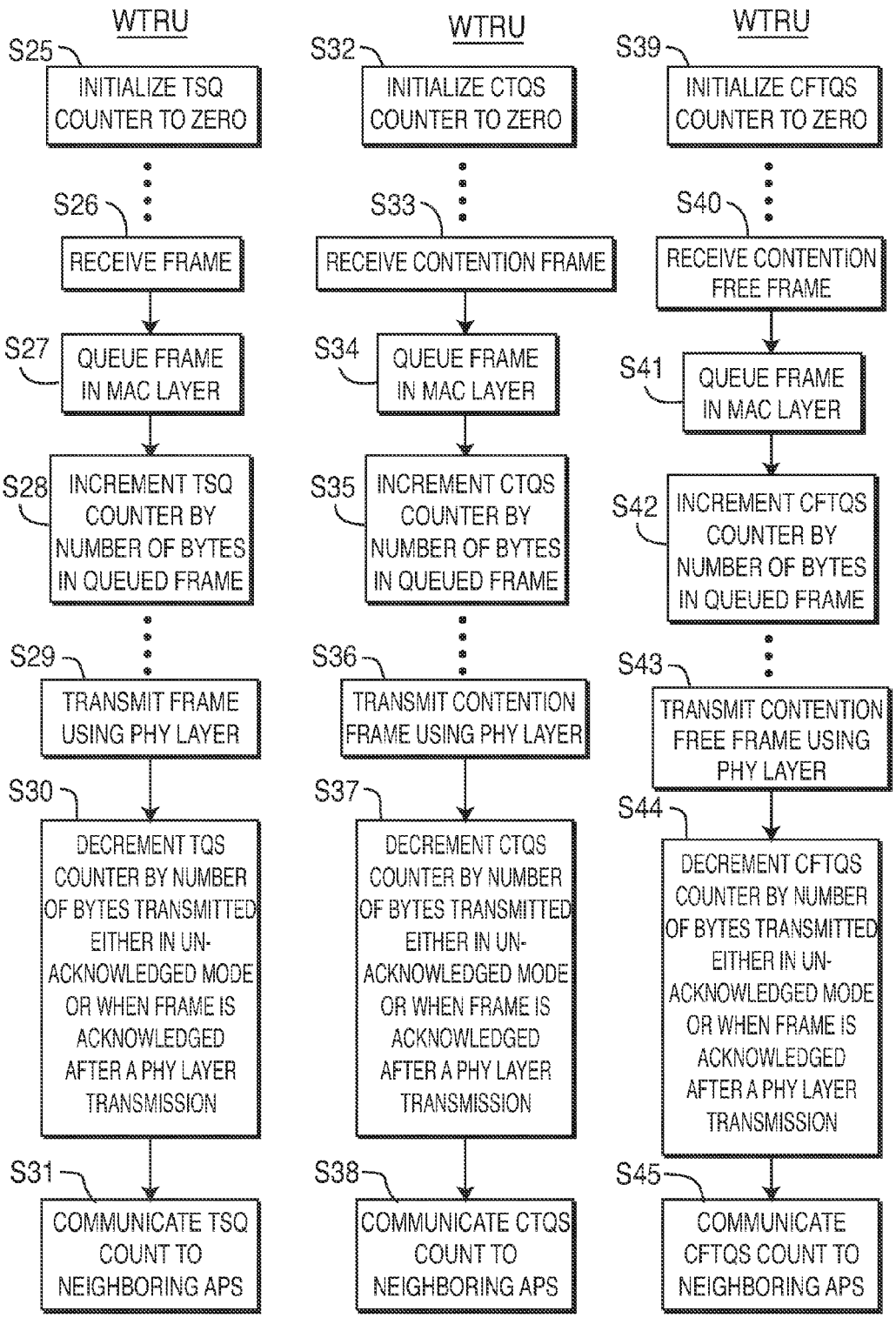
*FIG. 5*  *FIG. 6*  *FIG. 7*

| Octets: 1 | 1 | 2 | 1 | 1 | 2 |
|---|---|---|---|---|---|
| Element ID (46) | Length | Station Count (optional field) | Channel Utilization (optional field) | AP Service Load | Access Category Service Load (0 to 4 optional fields) |

Figure 10

| Access Category Indicator (ACI) | Average Access Delay (AAD) |
|---|---|
| Octets: 1 | 1 |

Figure 11

METHOD AND APPARATUS FOR DETERMINING AND MANAGING CONGESTION IN A WIRELESS COMMUNICATIONS SYSTEM

CROSS REFERENCE TO RELATED APPLICATIONS

This application is a continuation of U.S. patent application Ser. No. 10/939,785 filed Sep. 13, 2004, which issued on Aug. 23, 2011 as U.S. Pat. No. 8,005,055, which is a continuation-in-part of U.S. patent application Ser. No. 10/897,771 filed Jul. 23, 2004, which in turn claims priority from both U.S. Provisional Application No. 60/489,385 filed on Jul. 23, 2003, and U.S. Provisional Application No. 60/552,537 filed on Mar. 12, 2004, the contents of which are hereby incorporated by reference.

FIELD OF THE INVENTION

The present invention is related to the field of wireless communications. More specifically, the present invention relates to. Wireless Local Area Network (WLAN) systems that use a Carrier Sense Multiple Access/Collision Avoidance (CSMA/CA) mechanism and provides means for determining and managing congestion and further enhances network management by providing novel medium access control (MAC) measurements in wireless communications.

BACKGROUND OF THE INVENTION

Wireless communication systems are well known in the art. Generally, such systems comprise communication stations, which transmit and receive wireless communication signals between each other. Depending upon the type of system, communication stations typically are one of two types: base stations or wireless transmit/receive units (WTRUs), which include mobile units.

The term base station as used herein includes, but is not limited to, a base station, Node B, site controller, access point or other interfacing device in a wireless environment that provides WTRUs with wireless access to a network with which the base station is associated.

The term WTRU as used herein includes, but is not limited to, a user equipment, mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. Generically, base stations are also WTRUs.

Typically, a network of base stations is provided where each base station is capable of conducting concurrent wireless communications with appropriately configured WTRUs. Some WTRUs are configured to conduct wireless communications directly between each other, i.e., without being relayed through a network via a base station. This is commonly called peer-to-peer wireless communications. Where a WTRU is configured to communicate with other WTRUs it may itself be configured as and function as a base station. WTRUs can be configured for use in multiple networks with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

A popular local area network environment with one or more WLAN base stations, typically called access points (APs), is built according to the IEEE 802.11 family of standards. An example 802.11 Local Area Network (LAN), as shown in FIG. 1, is based on an architecture, wherein the system is subdivided into cells. Each cell comprises a Basic Service Set (BSS), which comprises at least one AP for communicating with one or more WTRUs which are generally referred to as stations (STAs) in the context of 802.11 systems. Communication between an AP and STAs is conducted in accordance with the IEEE 802.11 standard that defines the air interface between a wireless STA and a wired network.

A wireless LAN (WLAN) may be formed by a single BSS, with a single AP, having a portal to a distribution system (DS). However, installations are typically composed of several cells, and APs are connected through a backbone, referred to as a DS.

A mobile ad-hoc network (MANET) is also shown in FIG. 1. A MANET is a self-configuring network of mobile routers (and associated hosts) connected by wireless links—the union of which form an arbitrary topology. The routers are free to move randomly and organize themselves arbitrarily; thus, the network's wireless topology may change rapidly and unpredictably. Such a network may operate in a standalone fashion, or may be connected to the larger Internet.

An interconnected WLAN, including the different cells, their respective APs and the DS, is seen as a single IEEE 802.11 network and is referred to as an Extended Service Set (ESS). IEEE 802.11 networks typically use a Carrier-Sense Multiple Access/Collision Avoidance (CSMA/CA) protocol to exchange information wirelessly between nodes (or STAs) of the WLAN network. In this framework, STAs desiring to transmit must contend for access to the wireless medium. The contention mechanism involves waiting for the medium to remain idle for a certain period of time (according to a set of rules prescribed by the standard) before transmitting a data packet. The time it takes a node to access the channel and transmit its packet increases as the number of stations and data traffic increases. Congestion in such a system can occur when the time to gain access to the medium becomes intolerable due to too many stations competing for the same medium.

Due to the nature of the CSMA/CA protocol, and considering that most transmissions are best effort, it is quite difficult to determine when a system is classified as experiencing congestion. Determining congestion in such an complex system is not a simple task, as one choice of metrics could indicate congestion while another metric will not.

Several metrics that can be used to indicate congestion include: collision rate, channel utilization, i.e., the time that the medium is busy, etc. However, these metrics, taken individually do not necessarily give a true picture of the congestion. For example, the channel utilization metric does not give an accurate picture of the congestion situation. One station can be alone on a channel and transmitting all the time. In this case the channel utilization metric would be high. It may seem like the system would not be capable of supporting any more traffic from other stations. However, if a new station were to access the channel, it could still experience good throughput by virtue of the CSMA/CA mechanism, as the channel would then be equally shared between the two stations. A system is in fact congested when there are a number of stations contending for the same channel at a given time and experiencing severe delays due to the longer time each station has to wait for access to the medium, as well as the higher number of collisions.

In another aspect, there is currently limited network management functionality, particularly in systems compliant with the IEEE 802.11 and IEEE 802.11k standards. The inventors have recognized that there are certain limitations to the usefulness of channel loading information presently employed in the context of network management. There is also a need for an improved method of achieving better network management after considering the limitations of using channel-loading measurements. This present invention provides enhanced network management associated with the IEEE 802.11 and IEEE 802.11k standards in the context of channel loading information.

SUMMARY

The method and apparatus may be used for determining and transmitting congestion information in a wireless local area network (WLAN) system. The method and apparatus may be used for managing congestion when congestion is detected. The method and apparatus may be implemented in wireless systems that use CSMA/CA. Several metrics may be used to determine congestion including, for example: average duration of backoff procedure, in-Basic Service Set (in-BSS) deferral rate, out-of-BSS deferral rate, number of associated stations, mean WTRU channel utilization, and average buffer Medium Access Control (MAC) occupancy. Actions taken to relieve congestion may include, for example: sorting the set of WTRUs in order of most wasted time spent attempting to transmit acknowledged/unacknowledged packets, and disassociating each WTRU one at a time until the congestion is relieved.

The method and apparatus may be used to perform network management through the use of MAC measurements. The measurements may include, for example, a STA uplink traffic loading measurement, and/or an Access Point (AP) service loading measurement.

The method and apparatus may use a management information base (MIB) representation of the transmit queue size to provide, for example, a measure of the STA transmit load in terms of unserved, queued traffic demand. The method and apparatus may use a MIB representation of the AP service load to provide, for example, a measure of the AP service load to be used to assist STAs with handoff decisions. Implementation of these features may be as software or in any other convenient form. The method and apparatus may be applicable, for example, to layers 1 and 2 as applied to an IEEE 802.11k system in the context of orthogonal frequency division multiplexing (OFDM) and code division multiple access 2000 (CDMA 2000) systems. However, the method and apparatus may have applicability to other scenarios as well.

The methods may be implemented in selectively configured WTRUs and APs of various forms.

A more detailed understanding may be had from the following description of the embodiments, given by way of example and to be understood in conjunction with the accompanying drawings.

BRIEF DESCRIPTION OF THE FIGURES

FIGS. 2-9 are flow diagrams illustrating the techniques of the present invention for determining and managing congestion in wireless communications systems. More particularly:

FIGS. 2 and 2A together present a method for determining congestion using deferral rate (DR) and packet error rate (PER) metrics and disassociating WTRUs based on determining wasted time trying to transmit/retransmit unacknowledged packets.

FIG. 3 presents a method for managing load shedding by comparing the load of a node with advertised loads of neighboring nodes.

FIG. 4 presents a method for providing an advertised load to WTRUs based on average delay between a packet reaching the head of a queue and transmission of the packet.

FIGS. 5, 6 and 7 present a method for respectively providing a transmit queue size (TQS), contention-free transmit queue size (CFTQS) and contention transmit queue size (CTQS) to neighboring nodes.

FIG. 8 presents a method employed by a node for managing a channel based on evaluation of served and unserved traffic load from WTRUs and for providing a service load scalar for advertisement to WTRUs.

FIG. 9 presents a method employed by WTRUs for selecting a node based on load scalars provided by neighboring nodes.

FIG. 10 is a diagram of a BSS load element format in accordance with the present invention.

FIG. 11 is a diagram of an access category service load element format in accordance with the present invention.

DETAILED DESCRIPTION OF PREFERRED EMBODIMENTS

Figure 1:
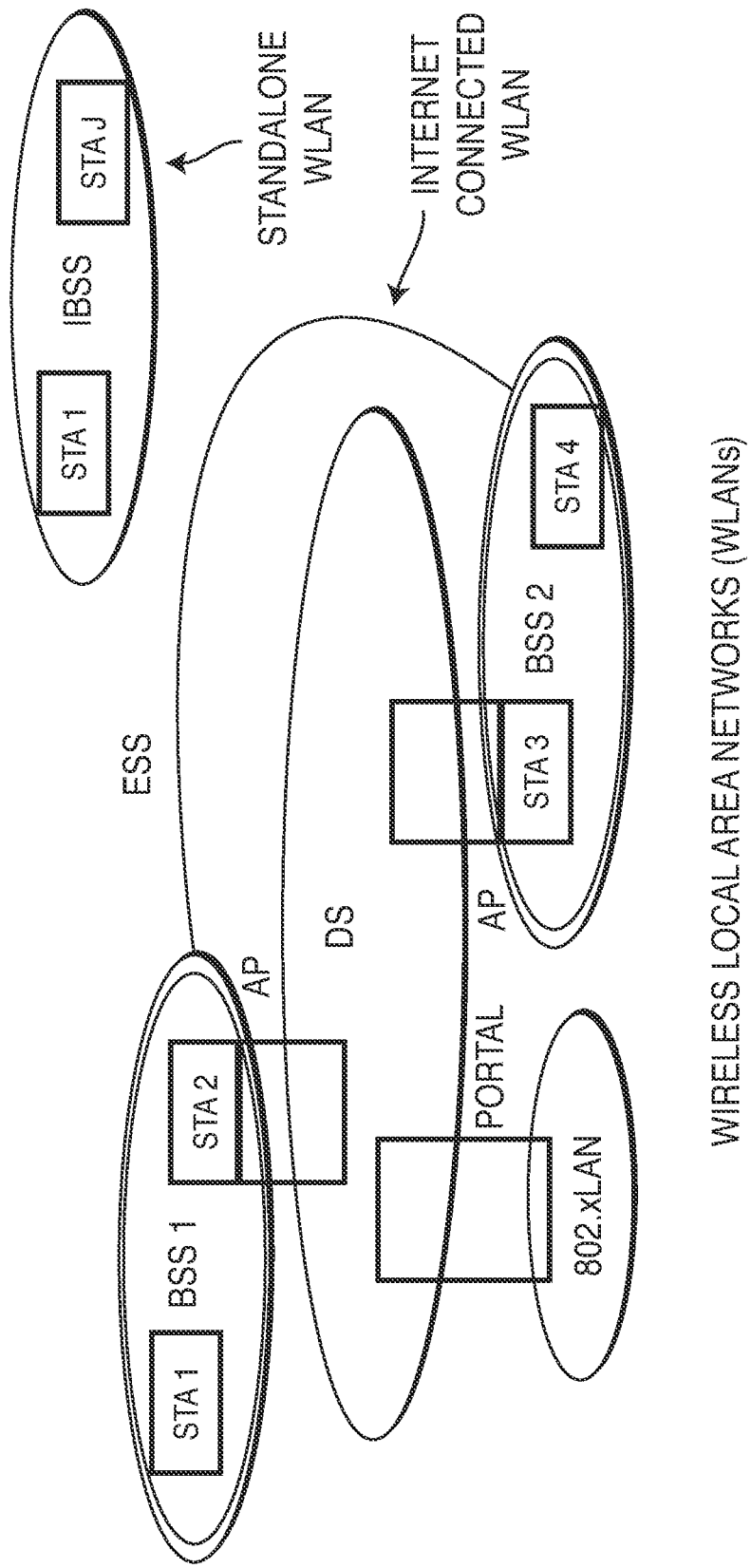
FIG. 1 is an overview diagram of a conventional IEEE802.11 WLANs with their corresponding components.

Although the features and elements of the present invention are described in the preferred embodiments in particular combinations, each feature or element can be used alone (without the other features and elements of the preferred embodiments) or in various combinations with or without other features and elements of the present invention.

One aspect of the present invention introduces two different approaches to determine the loading metric of channel congestion; first, a Basic Service Set (BSS)-based load metric, which is based primarily on the load of individual APs. Second, a channel-based load metric, which is a metric indicating the load shared amongst different APs.

BSS-based load metrics are metrics that determine high load condition and channel congestion. The two preferred BSS-based load metrics are: in-BSS deferral rate metric, and packet error rate metric.

The Deferral Rate (DR) is a measurement that represents the percentage of time that the receiver of the AP is carrier locked (i.e. Clear Channel Assessment (CCA) indicates a busy condition) while the AP has one or more packets to transmit (i.e. it's queue is not empty). In other words, DR represents the amount of time that the AP spends deferring transmission to other WLAN nodes.

The in-BSS Deferral Rate represents the percentage of time that the receiver of the AP is carrier locked onto an in-BSS packet (i.e. a packet originating from one of its associated WTRUs) while the AP has one or more packets to transmit. In other words, the in-BSS DR represents the amount of time that the AP spends deferring its own transmissions because one of its associated WTRUs has taken control of the medium (i.e. is transmitting a packet).

The in-BSS deferral rate is indicative of the level of the current load placed in a system, and when there is a need to transmit to another node in the same BSS, measuring the time spent deferring a transmission. A low in-BSS deferral metric indicates that the load for the BSS is low. A high in-BSS deferral rate indicates that there are many nodes transmitting at the same time and that there is thus a significant load.

In a case where there are only two nodes in the system with a significant amount of data to transmit, the deferral rate could be high and if used alone will indicate congestion. However, since there are only two nodes in the system, this is not considered a congestion situation. To address this situation, the present invention uses the packet error rate (PER) in addition to the deferral rate metric.

The Packet Error Rate (PER) is the ratio of the number of failed transmissions (i.e. packet transmissions for which an ACK was not received) to the total number of transmitted packets. The PER metric is a good indication of the collision rate in the system when conservative data transmission rates are used. The larger the number of nodes in a system, the higher the probability of collision. The use of both the in-BSS deferral rate metric and the PER metric together provide a better indication of the load of an AP than either metric used individually.

Figure 2:
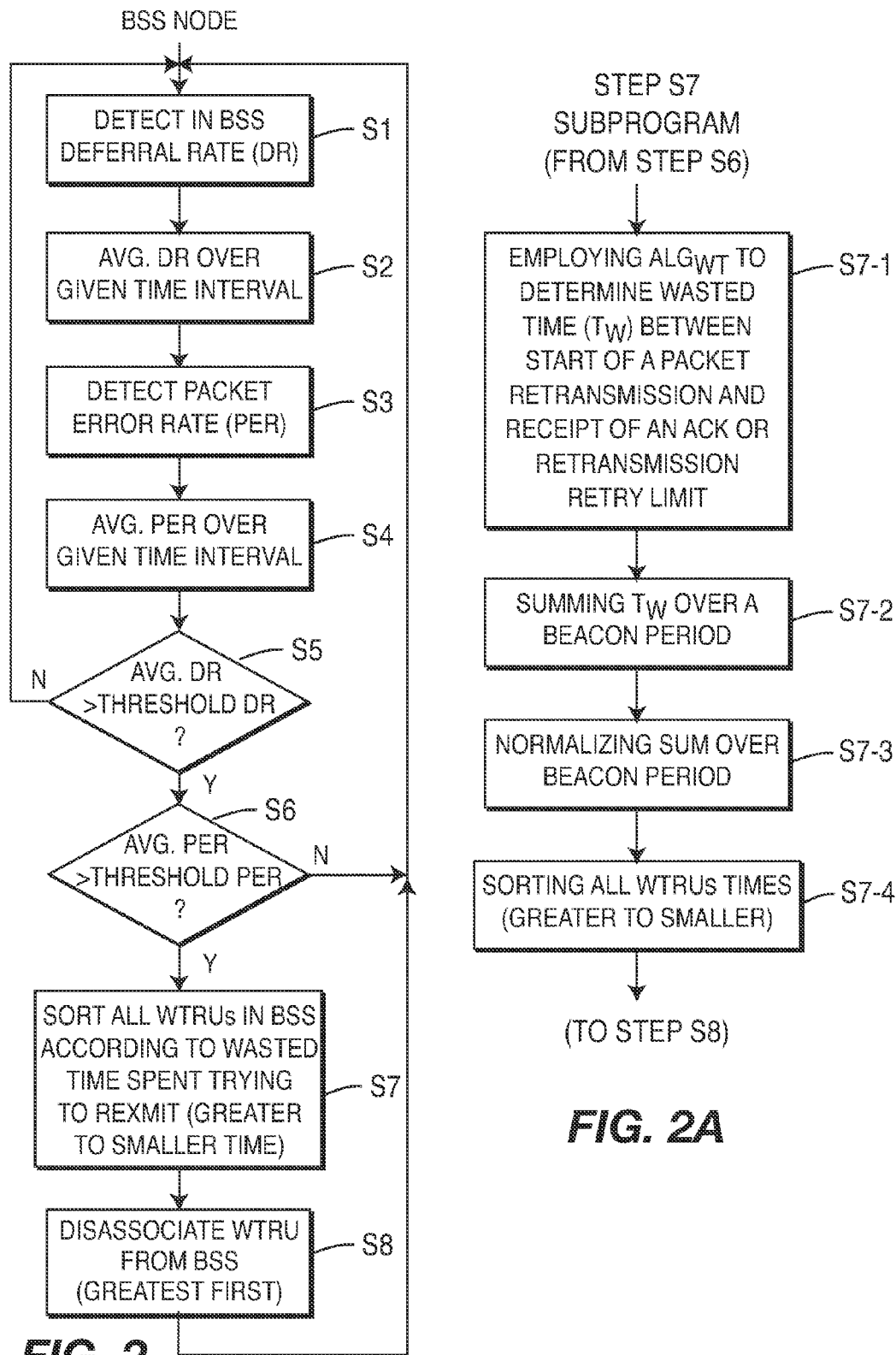

In the present invention, as shown in FIG. 2, in-BSS deferral rate metric and PER metric are respectively determined, at steps S1 and S3 and are then averaged over a predefined period of time (e.g. 30 seconds), at steps S2 and S4, respectively. The averages of both metrics are used to signal the occurrence of congestion at steps S5 and S6. More specifically, when in-BSS deferral rate (DR) metric exceeds a first predefined threshold, determined at step S5, and the PER metric exceeds a second predefined threshold, determined at step S6, over a given period (e.g., 30 seconds), then this is an indication of congestion.

Whether or not congestion is detected based on the criteria as set forth above, or employing other techniques for determining congestion, the present invention provides the following actions; first, the AP at step S7, sorts all WTRUs in the Basic Service Set (BSS) in order of the amount of time spent trying to retransmit. Wasted time is preferably determined in accordance with the wasted time algorithm ALG$_{wt}$ set forth below. More specifically, a set or list of WTRUs with unacknowledged packets is created. For each unacknowledged packet to a WTRUs, the sum of all the wasted time spent trying to transmit and re-transmit the packet (i.e. packet size/packet transmission rate plus a penalty for each retransmitted packet) is recorded. The penalty reflects the increasing delay associated with retransmissions, i.e. the backoff time due to the doubling of the congestion window (CW). The penalty represents the added delay incurred from the time the packet is ready for transmission to the time the packet is actually transmitted over the medium. This retransmit time metric is therefore much greater for stations wasting time retransmitting packets following collisions. The retransmit time metric is normalized over a selected time period.

An example formula for determining wasted time for a WTRU is given by:

$$\text{wasted\_txtime}_{WTRU} = \sum_{unackPkts} \sum_{i=1}^{\#\_pkts_j} \left( \frac{\text{Pkt\_size}_{ij}}{\text{Pkt\_tx\_rate}_{ij}} + RTx_{i>1} * \text{Penalty} \right)$$

where:
wasted_time$_{WTRU}$=sum of wasted time spent trying to transmit and retransmit unacknowledged packets to a WTRU j=j$^{th}$ packet
i=i$^{th}$ transmission of j$^{th}$ packet
_pkts$_j$=# of transmissions of j$^{th}$ packet, e.g. 1, 2, 3, . . .
Pkt_size$_{ij}$=size in bits of i$^{th}$ transmission of j$^{th}$ packet
Pkt_tx_rate$_{ij}$=transmission rate in bps of i$^{th}$ transmission of j$^{th}$ packet
RTx$_{i>1}$=2$^{i-2}$, for i>1, otherwise 0
Penalty=CW$_{min}$*slot time, e.g. CW$_{min}$=32 & slot time= 20 μs
Note: CW will be 2×CW$_{min}$ after first transmission.

Note that #_pkts$_j$ corresponds to the number of unacknowledged transmissions of a given packet. If the packet is eventually successfully transmitted, #_pkts$_j$ corresponds exactly to the number of retransmissions. If the packet is dropped (i.e. never successfully transmitted), #_pkts$_j$ corresponds to (number of retransmissions+1).

An example of the wasted_txtime$_{STA}$ calculation is given below:

Assume that an AP has 20 packets to send to a particular STA. During the course of the transmissions, the AP monitors and records whether the packet has been successfully acknowledged or not and the number packet re-transmissions as, for example, follows:

GGGGGBBB⇓ BBB⇓ GGGGG⇑ GGGGGG⇑ BBB ⇓GGGG where:
⇑=rate increase,
⇓=rate decrease,
G=acknowledged or "good" frame,
B=unacknowledged or "bad" frame The 1$^{st}$ B is the sixth packet and there were six transmissions of this sixth (6$^{th}$) packet, i.e.BBB⇓ BBB.
_pkts$_6$=6
Pkt_size$_{i6}$=12000 bits
Pkt_tx_rate$_{i6}$={11.0, 11.0, 11.0, 5.5, 5.5, 5.5} Mbps
RTx$_{i>1}$*Penalty={0.0, 640.0, 1280.0, 2560.0, 5120.0, 10240.0} us The 7$^{th}$ B is the 17$^{th}$ packet and there were three transmissions of this 17$^{th}$ packet, i.e. ⇑BBB⇓.
_pkts$_{17}$=3
Pkt_size$_{i17}$=8000 bits
Pkt_tx_rate$_{i17}$={11.0, 11.0, 11.0} Mbps
RTx$_{i>1}$*Penalty={0.0, 640.0, 1280.0} us Therefore:

$$\text{wasted\_txtime}_{STA}=(12000/11e6)+(12000/11e6+\\640.0)+(12000/11e6+1280.0)+(12000/5.5e6+\\2560.0)+(12000/5.5e6+5120.0)+(12000/5.5e6+\\10240.0)+(8000/11e6)+(8000/11e6+640.0)+\\(8000/11e6+1280.0)=33.76 \text{ ms}$$

Preferably, the WTRUs are sorted from greatest to smallest times at step S7-4. The program then advances to step S8. At step S8 (FIG. 2), each STA from the sorted list is disassociated greatest time first, until the congestion is relieved.

The present invention also provides for the use of other metrics including: BSS-based load metrics; the number of associated WTRUs, the time that the Access Point (AP) receives all acknowledgements (ACKS) (e.g. fragmentation) related to that packet at the medium access control (MAC), and the average buffer MAC occupancy (based on the size of the buffer).

Figure 3:
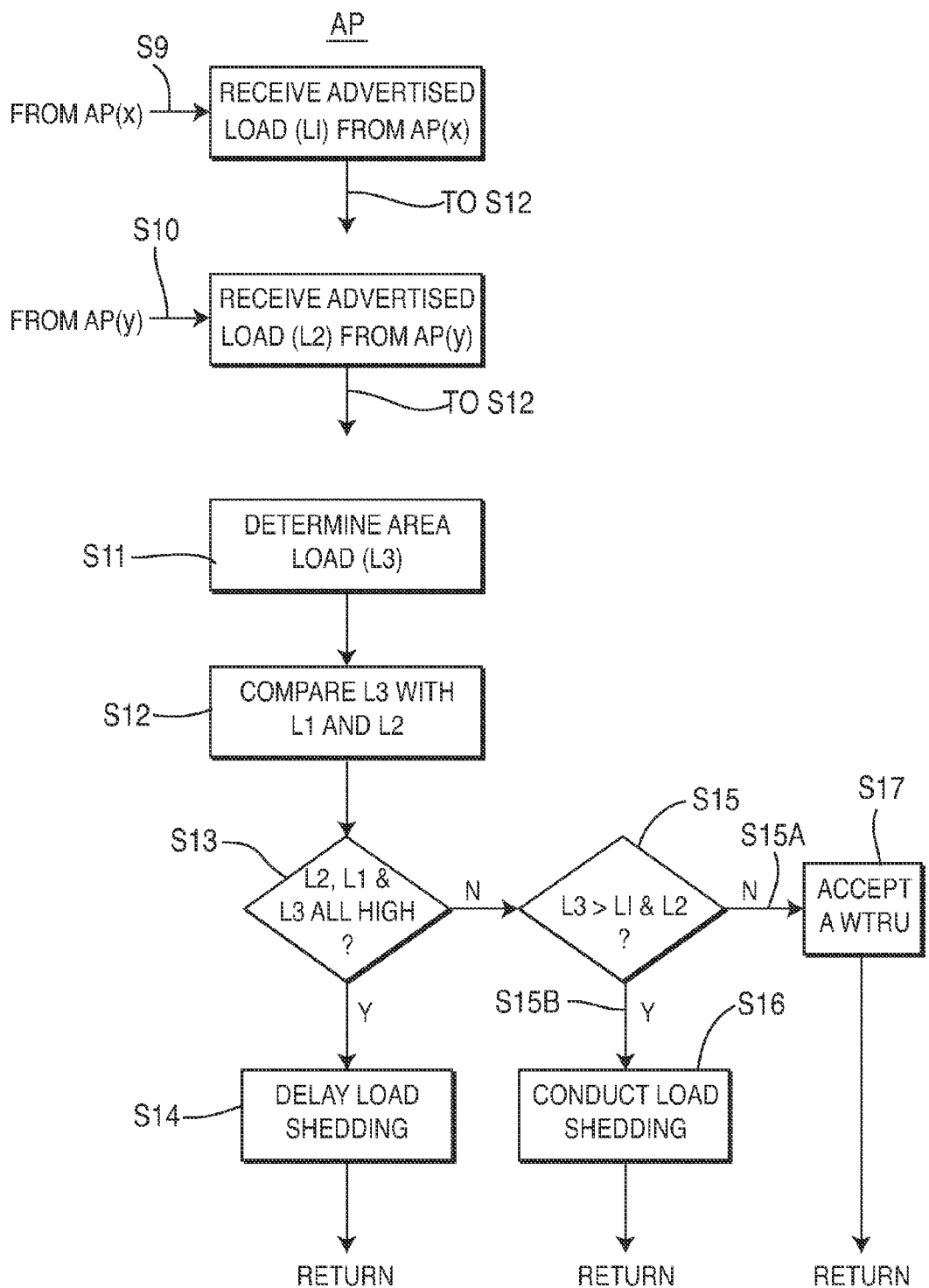

The present invention further provides a method that takes into account the load of the neighboring APs in assessing the system's need to perform any load shedding (i.e. disassociation) or load balancing. For example, as shown in FIG. 3, if the load of each of the neighboring APs is also high, as collected at steps S9 and S10, and compared with neighboring APs at steps S11 and S12, load shedding is delayed (step S14)

since the user would have a low probability of being served elsewhere, i.e., L1, L2 and L3 are all high (step S13). Load shedding is conducted, at step S16 if L1 or L2 have lower advertised loads (step S15B). If the L3 load is less then L1 and L2, the AP can accept a WRTU, as shown at steps S15A and S17.

For advertising loading to its stations (WTRUs), an Access Point (AP) can compare its load relative to neighboring APs, i.e. AP(x) and AP(y), for example. When an AP load is high compared to the estimated load of its neighboring APs, then the AP advertises a high load responsive to a determination at step S15A (FIG. 3). When the AP load is low compared to the estimated load of its neighbors, the AP advertises a low load responsive to a determination at step S15B.

Another method of the present invention is to use metrics that determine medium (i.e., channel) load. This metric enables the WTRU to choose the least loaded AP. Medium load metrics are used in cases when the In-BSS channel load is not effective, such as the case when a BSS with an In-BSS channel load could simply be deferring to a neighboring BSS, and therefore, although the load of the AP is low, the medium load is high. In this case, the advertised load should be representative of the medium load. In this case, an AP only advertises a low load when it is able to support the new WTRU.

Figure 4:
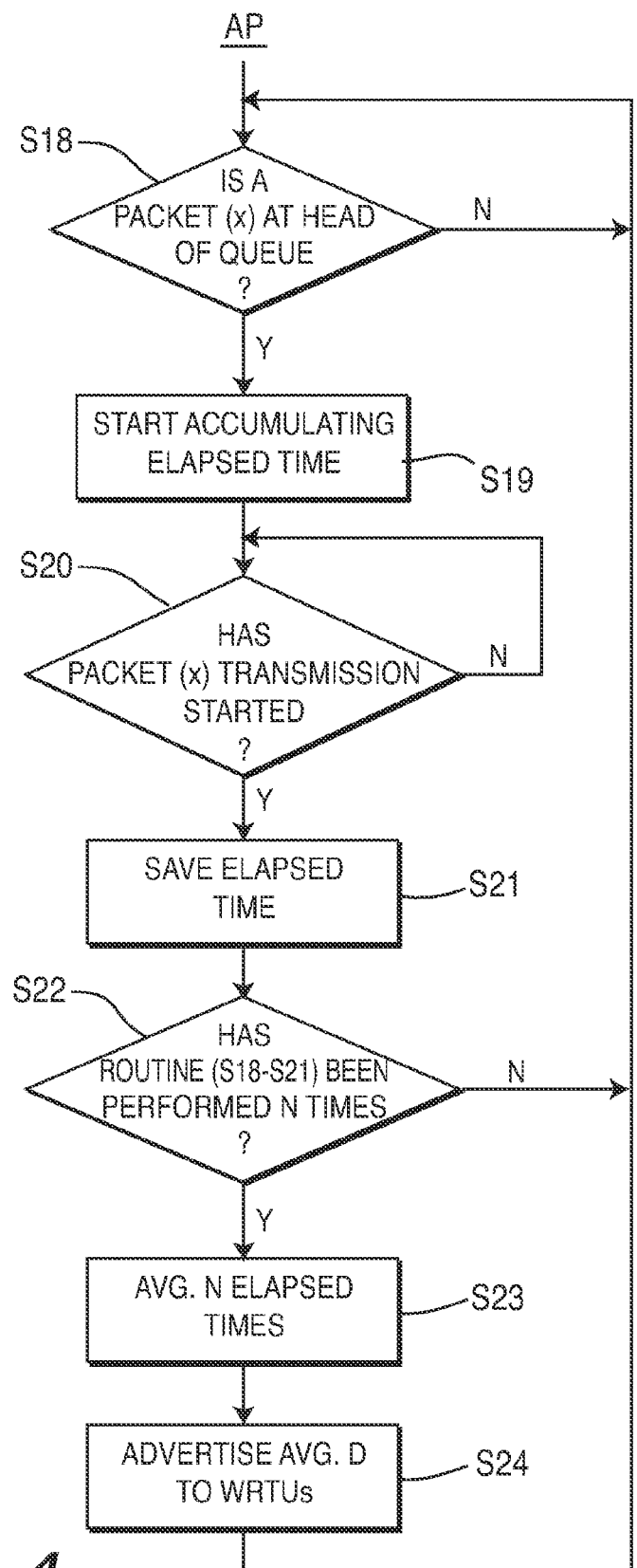

A metric that gives an indication of the medium load is the average duration (Avg D) required to execute the backoff procedure that is determined in the manner shown in FIG. 4 for downlink transmissions at an AP. More specifically, this metric represents the medium access delay incurred from the time a packet is ready for transmission (i.e. begins CSMA/CA access contention) to the time the packet starts transmission over the medium as determined at steps S18-S23, and advertising AvgD to WRTUs, at step S24.

The size of the contention window influences the duration needed to execute the backoff procedure. The contention window size is increased whenever an acknowledgement is not received from the receiving node. This aspect covers cases where collisions occur either between nodes of the same BSS or different BSSs. During the countdown of a backoff procedure, the countdown is suspended whenever the medium is sensed to be busy, which increases the duration of the backoff procedure. This additional aspect covers the cases when the medium is highly loaded due to WTRUs of the own BSS and/or neighboring BSSs. This metric taken alone provides a good indication of the congestion as perceived by this node in the BSS. One could consider simply using the time that the medium is busy (channel utilization) as a metric. However, in an example where only one WTRU is associated with the Access Point (AP) and is transmitting or receiving large amounts of data, the channel utilization metric will not give a good indication of the congestion. Channel utilization will indicate a high congestion when in fact the system is only supporting one user. A second user (WTRU) added to this AP could easily be supported. In the single user example, the new proposed Avg. D metric (i.e. the average duration to execute the backoff procedure) would correctly indicate low congestion.

The AvgD metric is a preferred measure since a short duration required for the backoff procedure indicates a lightly loaded medium, where a long duration indicates a heavily loaded medium. As an example, consider the current IEEE 802.11b standard. The minimum value for a contention window (CW) is 32×20 μsec=640 μsec, and the maximum value is 1023×20 μsec=20.5 msec. However, the duration required to execute the backoff may be greater than the maximum size of the CW, caused by the suspension of the countdown due to sensing a busy medium. This increase in duration will give an indication in load due to the activity in the medium.

The reasons for the use of MAC loading measurements in the context of the present invention include:
  The MAC layer has much information, which is not currently available via the management information base (MIB) or via measurements in the standard IEEE 802.11 and IEEE 802.11k.
  New information items provided by the present invention, which are useful to upper layers, are not presently available although they can be provided within the scope of 802.11k.
  IEEE 802.11e has identified channel utilization (CU) as a useful loading information item.

The present invention also recognizes that there is need for WTRU uplink loading information and AP service loading information. Some of the limitations of CU information include:
  Loading information is useful for handoff decisions in the WTRU and AP.
  CU information of a potential target AP is useful to WTRU when assessing handoff options.
  CU is the sum of uplink served load (all WTRUs to AP) and downlink served load (AP to all WTRUs), also known as channel utilization.
  Traffic load, however, consists of two parts: served traffic load and unserved (queued) traffic load.
  CU presently does not provide dynamic, unserved, queued traffic load information.
  The network has no current way to access unserved uplink traffic demand (queued traffic load).

The merits of WTRU uplink traffic loading measurements (UTLM) in network management include:
  A high channel load indicates served traffic close to maximum.
  If unserved traffic demand is low, this is optimal channel management.
  If unserved traffic demand is high, this is sub-optimal.
  Unserved uplink traffic demand is extremely useful to enable an AP to better partition uplink and downlink segments of frame time.
  APs need to manage the channel for maximum traffic utilization and minimal traffic blocking.
  Queued uplink traffic at WTRUs indicates transmission delays and potential channel blockage.
  The volume of data queued in the MAC transmission buffers provide a good measure of queued uplink load.

The present invention provides a new MAC management information base (MAC MIB) element for transmit traffic load, namely, Transmit Queue Size (TQS). Transmit Queue Size (TQS) is defined as follows: New MIB Information contains three (3) items: Total transmit queue size (TQS) consisting of the sum of Contention-free TQS (CFTQS) and Contention TQS (CFTQS).

TQS contains the current MAC queue size in bytes. TQS can be included in a MAC MIB 802.11 Counters Table. Dot11Counters Table is a defined data structure in the standard. TQS information may be implemented by a counter as shown in FIG. 5, the WTRU, at step S25, initializes the TQS counter to zero upon system start up. The WTRU, at step S26, receives a frame and, at step S27, queues the frame in the MAC layer. At step S28, the WTRU increments the TQS counter by the number of bytes in the queued frame. Alternatively, accumulation may use a software technique wherein a count may be stored in a memory and incremented by replacing a present count (PC) with PC+1, for example, as each byte of the frame is queued.

The WTRU, at step S29, transmits a frame employing the physical (PHY) layer when a session is initiated and, at step S30, decrements the TQS counter by the number of bytes transmitted, either when operating in the unacknowledged mode or when a frame is acknowledged by an AP after the PHY transmission. The WTRU, at step S31, communicates the TQS count to neighboring APs. TQS is a new MIB element. All MIB elements are transmitted to neighbors as needed via an MIB query performed to retrieve an element from a neighbor's MIB.

The contention transmit queue size (CTQS) is implemented as shown, for example, in FIG. 6, wherein the WTRU, at step S32, initializes the CTQS counter to zero at system startup. The MAC layer of the WTRU, at step S33, receives a contention frame and, at step S34, queues it in the contention queue of the MAC layer. At step S35, the CTQS counter is incremented by the number of bytes in the received frame.

The WTRU, at step S36, transmits the frame (to an AP, for example) employing the PHY layer when operating either in the unacknowledged mode or when the frame has been acknowledged after PHY transmission and, at step S37, decrements the CTQS counter by the number of bytes transmitted either in unacknowledged mode or when the frame is acknowledged after a PHY layer transmission. At step S38 the WTRU communicates the CTQS count to neighboring APs.

The contention free transmit queue size (CFTQS) is implemented, as shown in FIG. 7, by providing a CFTQS counter wherein the WTRU, at step S39, initializes the CFTQS counter to zero at system startup.

At step S40, the WTRU MAC layer receives a contention-free frame and, at step S41, queues the frame in the contention free queue (CFQ). At step S42, the WTRU increments the CFTQS counter by the number of bytes in the queued frame.

At step S43, the WTRU transmits a contention-free frame using the PHY layer and, at step S44, decrements the CFTQS counter by the number of bytes transmitted in the frame in the unacknowledged mode or when the frame is acknowledged after the PHY layer transmission. At step S45 the WTRU communicates the count to neighboring APs.

Figures 8, 9:
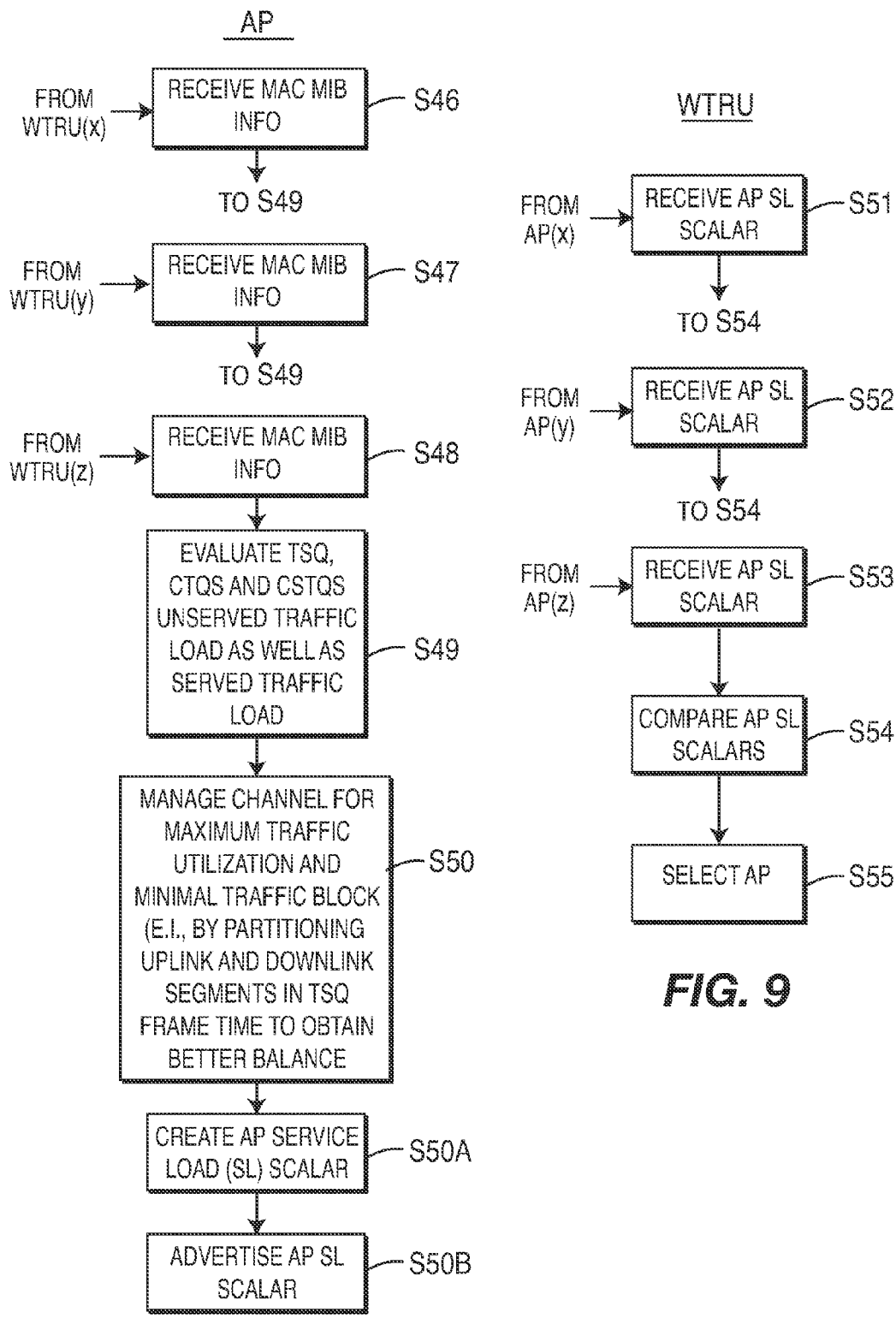

FIG. 8 shows one manner in which an AP utilizes the MAC MIB information, wherein the AP, at steps S46, S47 and S48, for example, respectively, receive MAC MIB information including one or more of the TSQ, CTQS and CFTQS counts, from WTRU(x), WTRU(y) and WTRU (z), for example. This data, which represents unserved traffic, is combined with served traffic data such as channel loading which includes both the uplink and downlink load, and is evaluated by the AP, at step S49 and, at step S50, utilizes the served and unserved load data to manage the channel, for example, by adjusting the traffic to maximize traffic utilization and minimize traffic blocking. The AP may adjust the uplink and downlink segments of frame, based upon unserved uplink traffic data, in order to optimize channel utilization.

The considerations for providing AP service loading measurements in the context of the invention include the following:

WTRUs may consider multiple APs as target APs for handoff. If two APs have similar channel loading and acceptable signal quality, the WTRU needs a capability of being able to determine which is the better AP. By enabling APs to post information concerning their ability to serve their existing set of WTRUs and their ability to serve additional WTRUs, channel usage can be optimized. This information is similar to a downlink traffic queue measurement for the AP modified by any AP specific information concerning its anticipated capacity.

The following addresses AP Service Load:

A new MAC MIB information item is provided to assist WTRUs in their handoff decisions.

A quantitative indication on a 255-value scale (represented by 8 binary bits, for example), from "not currently serving any WTRU", to "can't handle any new services" with a defined middle point indicating that the served load is optimal. For example:

0==Not serving any WTRU (idle AP or WTRU is not an AP)

1 through 254==scalar indication of AP Service Load.

255==unable to accept any new services

Exact specification of this MIB item is implementation-dependant and need not be specified with exactitude; a detailed definition to obtain maximum utility may be tailored to the characteristics of the particular network.

The new AP Service Load can be included in MAC dot11Counters Table or elsewhere in the MIB.

A WTRU having multiple APs that can be chosen as a target AP, in addition to a consideration of channel loading and acceptable signal quality, as shown in FIG. 9, can receive load advertisements from AP(x), AP(y) and AP(z), respectively shown at steps S51, S52 and S53, and, at step S54 evaluates the received AP advertised loads (SL scalars) and thus is able to make a decision based upon comparisons of the AP advertised loads received and, at step S55 selects an AP.

The AP service load (SL) is a scalar value and may, for example, be based upon served and unserved traffic, as well as other data such as signal quality, and anticipated capacity, based on statistical data, for example. The AP SL scalar may be created, as shown in step S50A of FIG. 8 and advertised to the neighboring WTRUs, as shown at step S50B.

The above methods are preferably implemented in selectively configured WTRUs. For example, a WTRU can be configured to assist in channel management in a wireless network by providing a memory device, a processor and a transmitter. The memory device is preferably configured to provide a queue of data frames for a medium access control (MAC) layer of the WTRU. The processor is preferably configured to determine queue size data representing unserved, queued traffic demand at the respective WTRU. The transmitter is preferably configured to communicate the queue size data to access points (APs) of the wireless network whereby a receiving AP utilizes the queue size data to assist in channel management. In particular, the processor is configured to initialize at zero a count representing queued data size at system startup and to increment the count by a number of bytes in a frame when the frame is queued by the medium access control (MAC) layer of the WTRU. Preferably the processor is configured to decrement the count by a number of bytes in a frame when a frame is transmitted by a physical (PHY) layer of the WTRU in an unacknowledged mode. As an alternative, the processor can be configured to decrement the count by a number of bytes in a frame when a frame is transmitted by a physical (PHY) layer of the WTRU when the frame has been acknowledged after a PHY transmission.

In such a WTRU, the memory is preferably configured with contention and contention free queues of the medium access control (MAC) layer and the processor is configured to determine contention transmit queue-size (CTQS) data representing unserved, queued traffic demand for the contention queue, contention free transmit queue-size (CFTQS) data representing unserved, queued traffic demand for the contention free queue and total transmit queue-size (TQS) data representing unserved, queued traffic demand for all transmit data queues of a medium access control (MAC) layer.

Such a WTRU preferably also includes a receiver configured to receive from APs service load indicators formulated based on queue size data received from WTRUs by the APs and a controller configured to select an AP for wireless communication based on the received load indicators.

An access point (AP) can be provided configured to provide channel management in a wireless network for both access points (APs) and wireless transmit receive units (WTRUs) capable of wireless communications with the APs over wireless channels. A receiver is configured to receive unserved traffic demand data received from WTRUs located within a wireless service range of the AP. The AP preferably has a processor configured to calculate a service load indicator based on unserved traffic demand data received from WTRUs. A transmitter is included that is configured to advertise the service load indicator to WTRUs within the AP wireless service range whereby WTRUs located within the AP wireless service range of the AP can use the advertised service load indicator to assist in selection of an AP with which to conduct a wireless communication. In such an AP, the receiver is preferably configured to receive advertised service load indicators from other APs and the processor is preferably configured to use the advertised service load indicators received from other APs to assist in decisions regarding disassociating operatively associated WTRUs from communications with the AP.

In another embodiment, a wireless transmit receive unit (WTRU) is configured to manage congestion in a wireless communication system defined by a base service set (BBS). The WTRU has a processor configured to determine an in-base service set (in-BSS) deferral rate (DR) and average said DR over a given time interval. Preferably, the processor is configured to also determine packet error rate (PER) and average said PER over said time interval. A memory is configured to store comparative values reflecting wasted time spent trying to transmit data for each of the WTRUs operatively associated with the WTRU in the BSS. A transceiver is included that is configured to disassociate operatively associated WTRUs from the WTRU commencing with a WTRU having a stored comparative value reflective of the greatest time spent trying to transmit data when said average DR and said average PER are greater than given thresholds.

In such a WTRU, the processor is preferably configured to average the DR and the PER over a time interval of the order of thirty seconds and the transceiver is configured to periodically receive and update the memory with comparative values reflecting wasted time spent trying to transmit data for each WTRU operatively associated with the WTRU.

In such a WTRU, the processor may also be configured to determine a comparative wasted time value by measuring the time it takes the WTRU to receive either a successful acknowledge (ACK) or negative acknowledgment (NACK) responsive to a transmitted data packet, summing the measured times during a beacon period and normalizing the sum by the beacon period. The transceiver is then preferably configured to periodically transmit current comparative values reflecting wasted time spent trying to transmit data to other WTRUs.

An access point AP may also be configured to assist wireless transmit receive stations (WTRUs) in selecting an access point AP with which to conduct wireless communication in a wireless communication system by providing it with selectively configured components. Preferably, a receiver is configured to receiving advertised load indicators of other APs. A processor is included that is configured to compare a communication load of the AP with received advertised load indicators from other APs and to determine an adjusted load of the AP based on said comparison. A transmitter is configured to advertise the adjusted AP load to WTRUs. Preferably, the processor is configured to periodically perform said comparing and determining operations in order to update the load that transmitter advertises to WTRUs.

In such an AP, the transmitter may be configured to advertise a low load when the processor determines that the communication load of the AP is low compared to the advertised load of other APs and to advertise a high load when the processor determines that the communication load of the AP is high compared to the advertised load of other APs. Also, the processor can be configured to determine a communication load of the AP by measuring delay between a time when a data packet is ready for transmission and a time when the packet is actually transmitted to a WTRU, averaging said delay over a given period, and utilizing the average delay to indicate load.

In another embodiment, a base station is configured to disassociate WTRUs from operative association therewith when a congestion condition is detected in a wireless network. The base station has a processor configured to determine wasted time (Tw) spent attempting to transmit/retransmit unacknowledged packets for each associated WTRU and to normalize wasted time Tw for each associated WTRU over a given time period. A memory is provided that is configured to store a list of associated WTRUs and their respective normalized wasted times. A transceiver is configured to disassociate WTRUs to relieve said congestion based on their respective normalized wasted times whereby a WTRU having a greatest Tw is disassociated first. Preferably, the processor is configured to add a penalty to said Tw representing increasing delay associated with retransmissions such as by being configured to calculate wasted transmission time (Tw) of WTRUs according to the formula set forth above.

IEEE 802.11e supports several access categories such as, for example, voice, video, best effort, and background traffic. In one embodiment, the present invention preferably utilizes the AP service load per access category. The BSS Load element contains information on the current station population, traffic level, and service level in the BSS. FIG. 10 shows an example of the element information fields in accordance with the present invention.

The Length field shall be set to the number of octets in the following fields. The Station Count field is interpreted as an unsigned integer that indicates the total number of STAs currently associated with this BSS. The Station Count field shall not be present in beacon or probe response frames if, purely by way of example, dot11QoSOptionImplemented, dot11QBSSLoadImplemented, and dot11RadioMeasurementEnabled are all true.

The Channel Utilization field is defined as the percentage of time the AP sensed the medium busy, as indicated by either the physical or virtual carrier sense mechanism. This percentage is represented as a moving average of ((channel busy time/(dot11ChannelUtilizationBeaconIntervals*dot11Beacon Period*1024))*255), where channel busy time is defined to be the number of microseconds during which the carrier sense mechanism has indicated a channel busy indication, and dot11ChannelUtilizationBeaconIntervals represents the number of consecutive beacon intervals during which the average should be calculated. The Channel Utilization field shall not be present in beacon or probe response frames if dot11QoSOptionImplemented, dot11QBSSLoadImplemented, and dot11RadioMeasurementEnabled are all true.

The AP Service Load shall be a scalar indication of the relative level of service loading at an AP. A low value shall indicate more available service capacity than a higher value.

The value 0 shall indicate that this AP is not currently serving any STA. The values between 0 and 254 shall be a logarithmically scaled representation of the average medium access delay for DCF transmitted packets measured from the time the DCF packet is ready for transmission (i.e. begins CSMA/CA access) until the actual packet transmission start time. A value of 1 shall represent a 50 μs delay while a value of 253 shall represent a 5.5 ms delay or any delay greater than 5.5 ms. The value 254 shall indicate no additional AP service capacity is available. The value 255 shall indicate that the AP Service Load is not available. The AP shall measure and average the medium access delay for all transmit packets using DCF access mechanism over a predetermined time window, such as a thirty second measurement window. The accuracy for the average medium access delay shall be +/−200 μs or better when averaged over at least 200 packets.

The Access Category (AC) Service Load elements may be provided in the BSS Load only at QoS enhanced APs (QAPs). The AC Service Load shall be a scalar indication of the Average Access Delay (AAD) at a QAP for services of the indicated Access Category. A low value shall indicate shorter access delay than a higher value. The value 0 shall indicate that this QAP is not currently providing services of the indicated AC. The values between 0 and 254 shall be a logarithmically scaled representation of the average medium access delay for transmitted packets in the indicated AC measured from the time the EDCF packet is ready for transmission (i.e. begins CSMA/CA access) until the actual packet transmission start time. A value of 1 shall represent a 50 μs delay while a value of 253 shall represent a 5.5 ms delay or any delay greater than 5.5 ms. The value 254 shall indicate that services at the indicated AC are currently blocked or suspended. The value 255 shall indicate that the AC Service Load is not available.

The QAP shall measure and average the medium access delay for all transmit packets of the indicated AC using EDCF access mechanism over a predetermined time window, such as a continuous thirty second measurement window. The accuracy for the average medium access delay shall be +/−200 μs or better when averaged over at least 200 packets. The AC Service load is preferably formatted as shown in FIG. 11, as two octet sub elements with the first octet containing the AC Indication (ACI) and the second octet containing the measured value of the AAD for the indicated AC. It should be noted that the octets shown in FIGS. 10 and 11 are provided just as an example and any other octet may be utilized. Table 1 shows an example of ACI encoding.

TABLE 1

| Access Category (AC) | ACI |
|---|---|
| Best Effort | 0 |
| Background | 1 |
| Video | 2 |
| Voice | 3 |
| Reserved | 4-255 |

While this invention has been particularly shown and described with reference to preferred embodiments, it will be understood by those skilled in the art that various changes in form and details may be made therein without departing from the scope of the invention as described hereinabove.

What is claimed is:

1. A method for use in an access point (AP), the method comprising:
generating a message that includes a plurality of fields that correspond to a plurality of access categories including a voice category, a video category, a best effort category, and a background category, wherein an integer value is indicated in the message for each of the plurality of access categories; and on a condition that a field of the plurality of fields is associated with a scaled representation of an average access delay, the integer value for the field of the plurality of fields indicates a first value, on a condition that a field of the plurality of fields represents that an access category of a respective one of the plurality of access categories is unavailable, the integer value for the field of the plurality of fields indicates a second value, and on a condition that a field of the plurality of fields represents that the scaled representation of the average access delay for an access category of the plurality of access categories is not available, the integer value for the field of the plurality of fields indicates a third value; and
transmitting the message to a wireless transmit/receive unit (WTRU).

2. The method of claim 1, wherein the average access delay is measured during a predetermined time period.

3. The method of claim 2, wherein the time period is thirty (30) seconds.

4. The method of claim 1, wherein the scaled representation is an 8 binary bit scaled representation.

5. The method of claim 4, wherein the 8 binary bit representation includes values from 1 to 252 that are a scaled representation of an average access delay for one of the plurality of access categories.

6. An access point (AP) comprising:
a processor configured to generate a message that includes a plurality of fields that correspond to a plurality of access categories including a voice category, a video category, a best effort category, and a background category, wherein an integer value is indicated in the message for each of the plurality of access categories; and on a condition that a field of the plurality of fields is associated with a scaled representation of an average access delay, the integer value for the field of the plurality of fields indicates a first value, on a condition that a field of the plurality of fields represents that an access category of a respective one of the plurality of access categories is unavailable, the integer value for the field of the plurality of fields indicates a second value, and on a condition that a field of the plurality of fields represents that the scaled representation of the average access delay for an access category of the plurality of access categories is not available, the integer value for the field of the plurality of fields indicates a third value; and
a transmitter configured to transmit the message to a wireless transmit/receive unit (WTRU).

7. The AP of claim 6 further comprising:
a receiver configured to receive a service load indicator from another AP.

8. The AP of claim 6 wherein the average access delay is measured during a predetermined time period.

9. The AP of claim 8 wherein the time period is thirty (30) seconds.

10. The AP of claim 6 wherein the scaled representations are 8 binary bit scaled representation.

11. The AP of claim 10 wherein the 8 binary bit representation includes values from 1 to 252 that are a scaled representation of an average access delay for one of the plurality of access categories.

12. A method for use in a wireless transmit/receive unit (WTRU), the method comprising:
receiving a message that includes a plurality of fields that correspond to a plurality of access categories including a voice category, a video category, a best effort category, and a background category, wherein an integer value is indicated in the message for each of the plurality of access categories; and on a condition that a field of the plurality of fields is associated with a scaled representation of an average access delay, the integer value for the field of the plurality of fields indicates a first value, on a condition that a field of the plurality of fields represents that an access category of a respective one of the plurality of access categories is unavailable, the integer value for the field of the plurality of fields indicates a second value, and on a condition that a field of the plurality of fields represents that the scaled representation of the average access delay for an access category of the plurality of access categories is not available, the integer value for the field of the plurality of fields indicates a third value; and
selecting an access point (AP) based on the message.

13. The method of claim 12, wherein the message includes an 8 binary bit scaled representation including values from 1 to 252 that are a scaled representation of an average access delay for one of the plurality of access categories.

14. A wireless transmit/receive unit (WTRU) comprising:
a receiver configured to receive a that includes a plurality of fields that correspond to a plurality of access categories including a voice category, a video category, a best category, and a background category, wherein an integer value is indicated in the message for each of the plurality of access categories; and on a condition that a field of the plurality of fields is associated with a scaled representation of an average access delay, the integer value for the field of the plurality of fields indicates a first value, on a condition that a field of the plurality of fields represents that an access category of a respective one of the plurality of access categories is unavailable, the integer value for the field of the plurality of fields indicates a second value, and on a condition that a field of the plurality of fields represents that the scaled representation of the average access delay for an access category of the plurality of access categories is not available, the integer value for the field of the plurality of fields indicates a third value; and
a processor configured to select an access point (AP) based on the message.

15. The WTRU of claim 14 wherein the message includes an 8 binary bit scaled representation including values from 1 to 252 that is a scaled representation of an average access delay for one of the plurality of access categories.

16. The method of claim 12, wherein the average access delay is measured by the AP during a predetermined time period.

17. The method of claim 12, wherein the scaled representation is an 8 binary bit scaled representation.

18. The WTRU of claim 14, wherein the average access delay is measured by the AP during a predetermined time period.

19. The WTRU of claim 14, wherein the scaled representation is an 8 binary bit scaled representation.

20. A wireless transmit/receive unit (WTRU) comprising:
a receiver configured to receive, from an access point (AP), a message that includes a plurality of fields that correspond to a plurality of access categories including a voice category, a video category, a best effort category, and a background category, wherein an integer value is indicated in the message for each of the plurality of access categories; and on a condition that a field of the plurality of fields is associated with a scaled representation of an average access delay, the integer value for the field of the plurality of fields indicates a first value, on a condition that a field of the plurality of fields represents that an access category of a respective one of the plurality of access categories is unavailable, the integer value for the field of the plurality of fields indicates a second value, and on a condition that a field of the plurality of fields represents that the scaled representation of the average access delay for an access category of the plurality of access categories is not available, the integer value for the field of the plurality of fields indicates a third value; and
a processor configured to decode the message.

21. The WTRU of claim 20, wherein the scaled representation of an average access delay includes a value from 1 to 252.

22. The WTRU of claim 20, wherein the average access delay is measured by the AP during a predetermined time period.

23. The WTRU of claim 20, wherein the scaled representation of an average access delay is an 8 binary bit scaled representation.

24. A method for use in a wireless transmit/receive unit (WTRU) comprising:
receiving, from an access point (AP), a message that includes a plurality of fields that correspond to a plurality of access categories including a voice category, a video category, a best effort category, and a background category, wherein an integer value is indicated in the message for each of the plurality of access categories; and on a condition that a field of the plurality of fields is associated with a scaled representation of an average access delay, the integer value for the field of the plurality of fields indicates a first value, on a condition that a field of the plurality of fields represents that an access category of a respective one of the plurality of access categories is unavailable, the integer value for the field of the plurality of fields indicates a second value, and on a condition that a field of the plurality of fields represents that the scaled representation of the average access delay for an access category of the plurality of access categories is not available, the integer value for the field of the plurality of fields indicates a third value; and
decoding the message.

25. The method of claim 24, wherein the scaled representation of an average access delay includes a value from 1 to 252.

26. The method of claim 24, wherein the average access delay is measured by the AP during a predetermined time period.

27. The method of claim 24, wherein the scaled representation of an average access delay is an 8 binary bit scaled representation.

* * * * *

UNITED STATES PATENT AND TRADEMARK OFFICE
CERTIFICATE OF CORRECTION

PATENT NO. : 8,953,573 B2  Page 1 of 1
APPLICATION NO. : 13/212632
DATED : February 10, 2015
INVENTOR(S) : Kwak et al.

It is certified that error appears in the above-identified patent and that said Letters Patent is hereby corrected as shown below:

IN THE SPECIFICATION

At column 3, line 67, after the word "IEEE802.11", delete "WLANs" and insert therefor --WLAN--.

At column 3, line 67, after the word "with", delete "their" and insert therefor --its--.

At column 5, line 43, after the word "a", delete "WTRUs" and insert therefor --WTRU--.

At column 6, line 22, after the word "number", insert therefor --of--.

At column 7, line 4, after the word "less", delete "then" and insert therefor --than--.

At column 7, line 34, after the word "to", delete "WRTUs" and insert therefor --WTRUs--.

At column 7, line 44, after the word "of", delete "the" and insert therefor --their--.

At column 8, line 54, after the word "TQS", delete "(CFTQS)" and insert therefor --(CTQS)--.

At column 9, line 44, after the word "the", delete "TSQ" and insert therefor --TQS--.

IN THE CLAIMS

In claim 10, at column 14, line 67, after the word "scaled", delete "representation" and insert therefor --representations--.

In claim 14, at column 15, line 33, after the words "to receive a", insert therefor --message--.

Signed and Sealed this
First Day of March, 2016

Michelle K. Lee
*Director of the United States Patent and Trademark Office*